(12) United States Patent
Watanabe

(10) Patent No.: US 8,774,132 B2
(45) Date of Patent: Jul. 8, 2014

(54) BASE STATION DEVICE, BASE STATION CONTROLLING DEVICE, MOBILE TERMINAL, COMMUNICATION SYSTEM, AND METHOD FOR CONTROLLING BASE STATION DEVICE

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 13/358,053

(22) Filed: Jan. 25, 2012

(65) Prior Publication Data

US 2012/0120921 A1 May 17, 2012

Related U.S. Application Data

(63) Continuation of application No. PCT/JP2009/064564, filed on Aug. 20, 2009.

(51) Int. Cl.
*H04W 52/40* (2009.01)
(52) U.S. Cl.
USPC ........... 370/331; 370/329; 455/436; 455/439; 455/442
(58) Field of Classification Search
USPC ................... 370/331, 329; 455/436, 439, 442
See application file for complete search history.

(56) References Cited

U.S. PATENT DOCUMENTS

| | | | |
|---|---|---|---|
| 6,931,253 B1 * | 8/2005 | Hartikainen et al. | 455/450 |
| 7,035,644 B1 | 4/2006 | Maruyama | |
| 2005/0276256 A1 | 12/2005 | Raitola et al. | |
| 2009/0117906 A1 * | 5/2009 | Thomas | 455/439 |
| 2009/0156219 A1 * | 6/2009 | Kim et al. | 455/442 |
| 2010/0260143 A1 | 10/2010 | Tanabe et al. | |

FOREIGN PATENT DOCUMENTS

| | | |
|---|---|---|
| JP | 2003-524335 | 8/2003 |
| JP | 2004-363730 | 12/2004 |
| JP | 2009-88957 | 4/2009 |
| WO | 99/31823 | 6/1999 |
| WO | 00/05913 | 2/2000 |

OTHER PUBLICATIONS

International Search Report issued for corresponding International Patent Application No. PCT/JP2009/064564, mailed Oct. 27, 2009.

\* cited by examiner

*Primary Examiner* — Jianye Wu
*Assistant Examiner* — Jeff Banthrongsack
(74) *Attorney, Agent, or Firm* — Myers Wolin, LLC

(57) ABSTRACT

A base station device that communicates wirelessly with a mobile terminal, including: an accepting portion that determines whether to be capable of accepting handover from another base station device to the base station device; a determination portion that, when the accepting portion determines to be capable of accepting the handover, determines whether to aggregate or separate bearers set between the another base station device and the mobile terminal; and a notifying portion that notifies the mobile terminal of a determination result of aggregation or separation of the bearers.

9 Claims, 16 Drawing Sheets

US 8,774,132 B2

BASE STATION DEVICE, BASE STATION CONTROLLING DEVICE, MOBILE TERMINAL, COMMUNICATION SYSTEM, AND METHOD FOR CONTROLLING BASE STATION DEVICE

CROSS-REFERENCE TO RELATED APPLICATION

This application is a continuation application of PCT/JP2009/064564 filed Aug. 20, 2009, the contents of which are herein wholly incorporated by reference.

FIELD

A certain aspect of the embodiments is related to a base station device, a base station controlling device, a mobile terminal, a communication system and a method for controlling a base station device.

BACKGROUND

In a communication system in which a base station and a mobile terminal wirelessly communicate with each other, a bearer is set from the mobile terminal to a node of a core network via the base station. When the mobile terminal performs handover from a source base station to a target base station, the number of bearers and the quality for each bearer are maintained.

There is known a communication system that transmits a channel capacity assigned until now between the source base station and the mobile terminal, to the target base station of the handover when the handover is performed (e.g. International Publication Pamphlet No. WO99/31823). There is known a communication system that readjusts the capacity of the bearers when the handover is performed (e.g. Japanese National Publication of International Patent Application No. 2003-524335).

SUMMARY

According to an aspect of the present invention, there is provided a base station device that communicates wirelessly with a mobile terminal, including: an accepting portion that determines whether to be capable of accepting handover from another base station device to the base station device; a determination portion that, when the accepting portion determines to be capable of accepting the handover, determines whether to aggregate or separate bearers set between the another base station device and the mobile terminal; and a notifying portion that notifies the mobile terminal of a determination result of aggregation or separation of the bearers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments of the invention, with reference to drawings.

Embodiment 1

Figure 1:
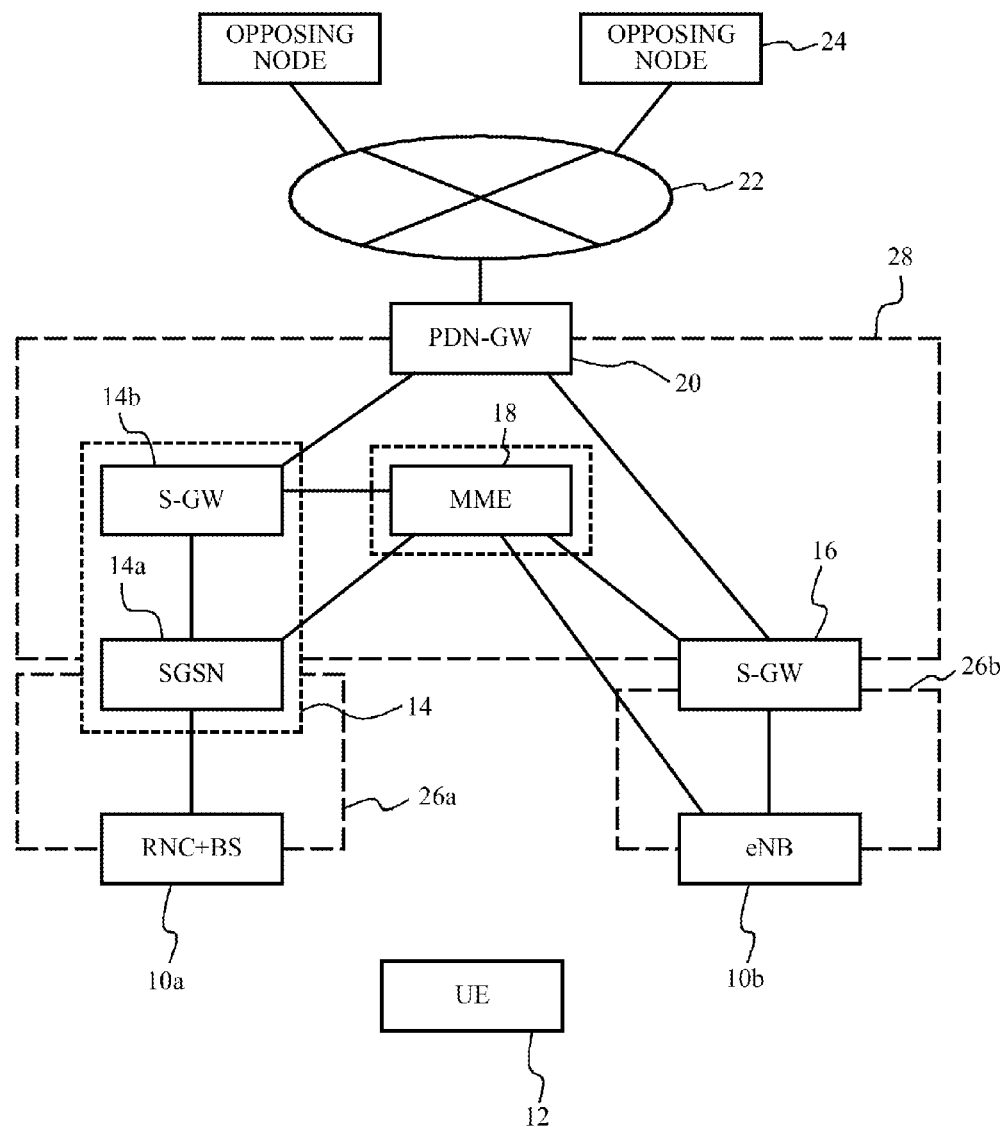
FIG. 1 is a block diagram illustrating an example of radio communication systems of a first embodiment.

FIG. 1 is a block diagram illustrating an example of radio communication systems of a first embodiment. In the first embodiment, a description will be given of an example of handover in 3GPP (3rd Generation Partnership Project) system between an UTRA (Universal Terrestrial Radio Access) and eUTRA (Evolved Universal Terrestrial Radio Access) that is a next-generation communication system, namely LTE (Long Term Evolution).

With reference to FIG. 1, a radio communication system 26a is the UTRA, and a radio communication system 26b is the eUTRA. A base station 10a of the radio communication system 26a is a combination of a RNC (Radio Network Controller) and a BS (Base Station). A base station 10b of the radio communication system 26b is an eNB (E-UTRAN NodeB). The base stations 10a and 10b communicate wirelessly with a mobile terminal 12 (UE; User Equipment). A radio access system GW (Gate Way) node 14 of the radio communication system 26a and a core network system 28 includes a SGSN (Serving GPRS Support Node) 14a and a S-GW (Serving GateWay) 14b. A core network GW node is a PDN-GW (Packet Data Network GW) 20. The PDN-GW 20 is connected to opposing nodes 24 via a network 22.

Transmission and reception of data between the mobile terminal 12 and the opposing nodes 24 is performed by establishing a user plane which goes through the base station 10a, the SGSN 14a, the S-GW 14b, and the PDN-GW 20. A MME (Mobility Management Entity) 18 that is a mobile management node in the core network system 28 controls the movement of the mobile terminal 12 via the SGSN 14a and the S-GW 14b. In addition, the MME 18 manages the movement of the mobile terminal 12 via the S-GW 16.

Figure 2:
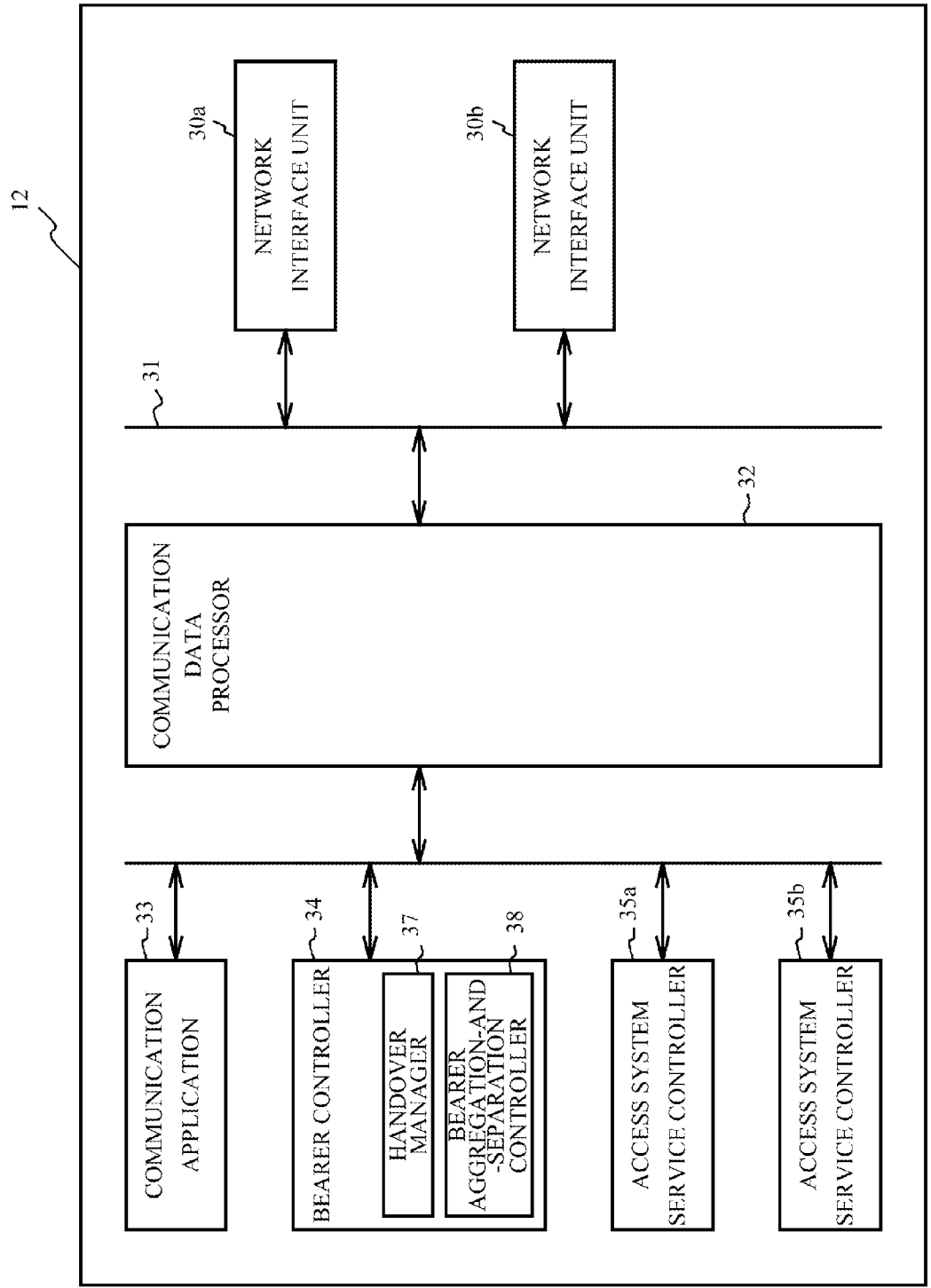
FIG. 2 is a block diagram of a mobile terminal.

FIG. 2 is a block diagram of the mobile terminal 12. The mobile terminal 12 includes network interface units 30a and 30b, a communication data processor 32, a communication application unit 33, a bearer controller 34, and access system service controllers 35a and 35b. The elements are connected to each other via a bus 31. The network interface units 30a and 30b perform the termination of layer 1-3 protocols to the base stations 10a and 10b, respectively. Thus, the network interface units 30a and 30b are provided for UTRA and eUTRA respectively. Data received from the base stations 10a and 10b is transmitted to the communication data processor 32 via the bus 31, and data received from the communication data processor 32 is transmitted to the base stations 10a and 10b.

The communication data processor 32 transmits and receives data between the communication application unit 33 and the PDN-GW 20, using a bearer based on bearer setting information. The communication data processor 32 performs a process relating a data transfer protocol for the transmission and reception of the data. The communication data processor 32 recognizes signal information addressed to self-equipment, such as a bearer setting message, and transmits and receives data to/from other function (other unit) which processes signal information.

The bearer controller 34 receives a result of processing of a bearer control signal by the other unit, and causes the communication data processor 32 to perform bearer setting. Thus, the bearer controller 34 manages bearer control information. Moreover, the bearer controller 34 includes a handover manager 37, and a bearer aggregation-and-separation controller 38. The handover manager 37 manages the handover. The bearer aggregation-and-separation controller 38 controls aggregation and separation of the bearers.

The access system service controllers 35a and 35b perform the termination of signals corresponding to the radio communication systems 26a and 26b, respectively. Thus, the plurality of access system service controllers 35a and 35b are provided according to the plurality of radio communication systems 26a and 26b existing. The access system service controllers 35a and 35b perform setting and releasing of a user plane, and control of the movement management according to the radio communication systems 26a and 26b, respectively.

The communication application unit 33 runs applications which a user of the mobile terminal 12 uses. The communication application unit 33 is a transmission and reception source of data transmitted and received to/from the opposing nodes 24.

Figure 3:
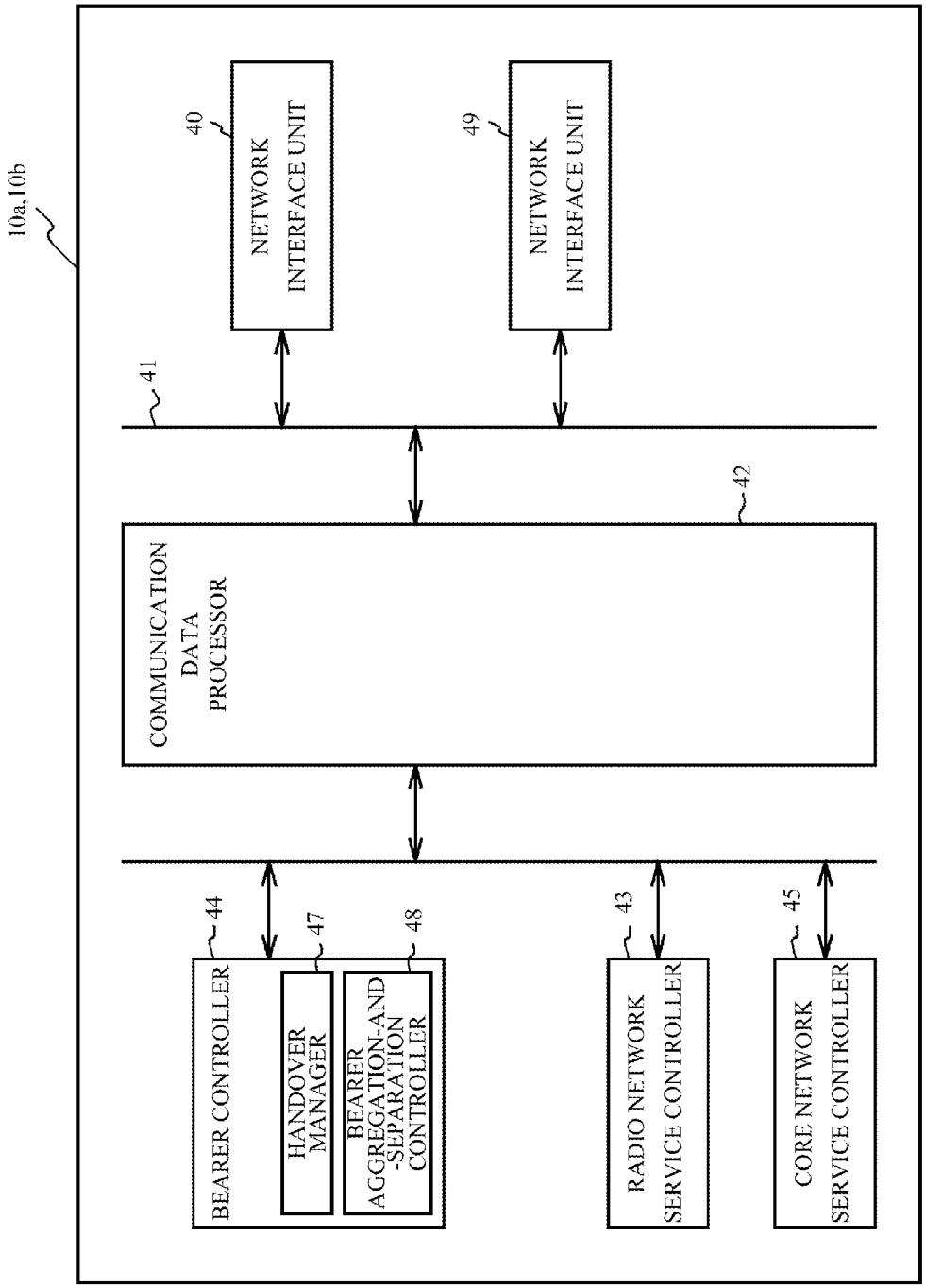
FIG. 3 is a block diagram of a base station.

FIG. 3 is a block diagram of the base stations 10a and 10b. Each of the base stations 10a and 10b includes network interface units 40 and 49, a communication data processor 42, a bearer controller 44, a radio network service controller 43, and a core network service controller 45. The elements are connected to each other via a bus 41. The network interface unit 40 transmits and receives data to/from the mobile terminal 12. The network interface unit 49 transmits and receives data to/from the GW node 14 or the S-GW 16. The network interface unit 49 of the base station 10b also transmits and receives data to/from the MME 18.

The communication data processor 42 performs routing of data and a process of a data transfer protocol. The bearer controller 44 causes the communication data processor 42 to perform the bearer setting. The bearer controller 44 includes a handover manager 47, and a bearer aggregation-and-separation controller 48. The handover manager 47 manages the handover. The bearer aggregation-and-separation controller 48 controls aggregation and separation of the bearers.

The radio network service controller 43 performs the termination of a service control signal to the mobile terminal 12, the setting and releasing of a channel of a radio zone, and the movement management. The core network service controller 45 performs the termination of the service control signals to/from the core network system 28, the setting and releasing of a channel other than the radio zone, and the movement management.

Figure 4:
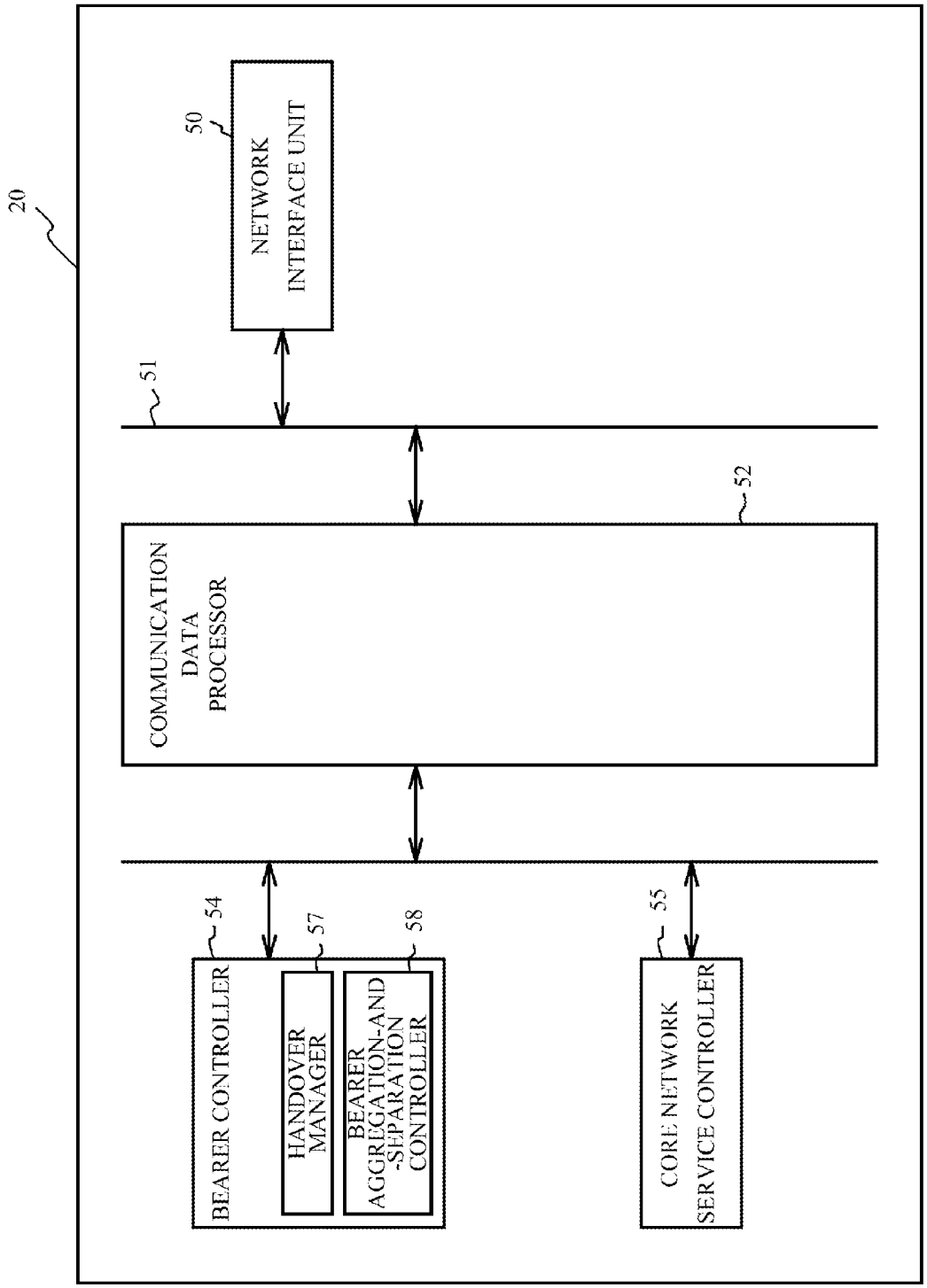
FIG. 4 is a block diagram of a PDN-GW.

FIG. 4 is a block diagram of the PDN-GW 20. The PDN-GW 20 includes a network interface unit 50, a communication data processor 52, a bearer controller 54, and a core network service controller 55. The elements are connected to each other via a bus 51. The network interface unit 50 transmits and receives data to/from the opposing nodes 24 via the network 22. The network interface unit 50 also transmits and receives data to/from the core network system 28.

The communication data processor 52 performs routing of data and a process of a data transfer protocol. The bearer controller 54 causes the communication data processor 52 to perform the bearer setting. The bearer controller 54 includes a handover manager 57, and a bearer aggregation-and-separation controller 58. The handover manager 57 manages the handover. The bearer aggregation-and-separation controller 58 controls aggregation and separation of the bearers.

The core network service controller 55 performs the termination of the service control signals to/from the core network system 28, the setting and releasing of a channel other than the radio zone, and the movement management.

Figure 5:
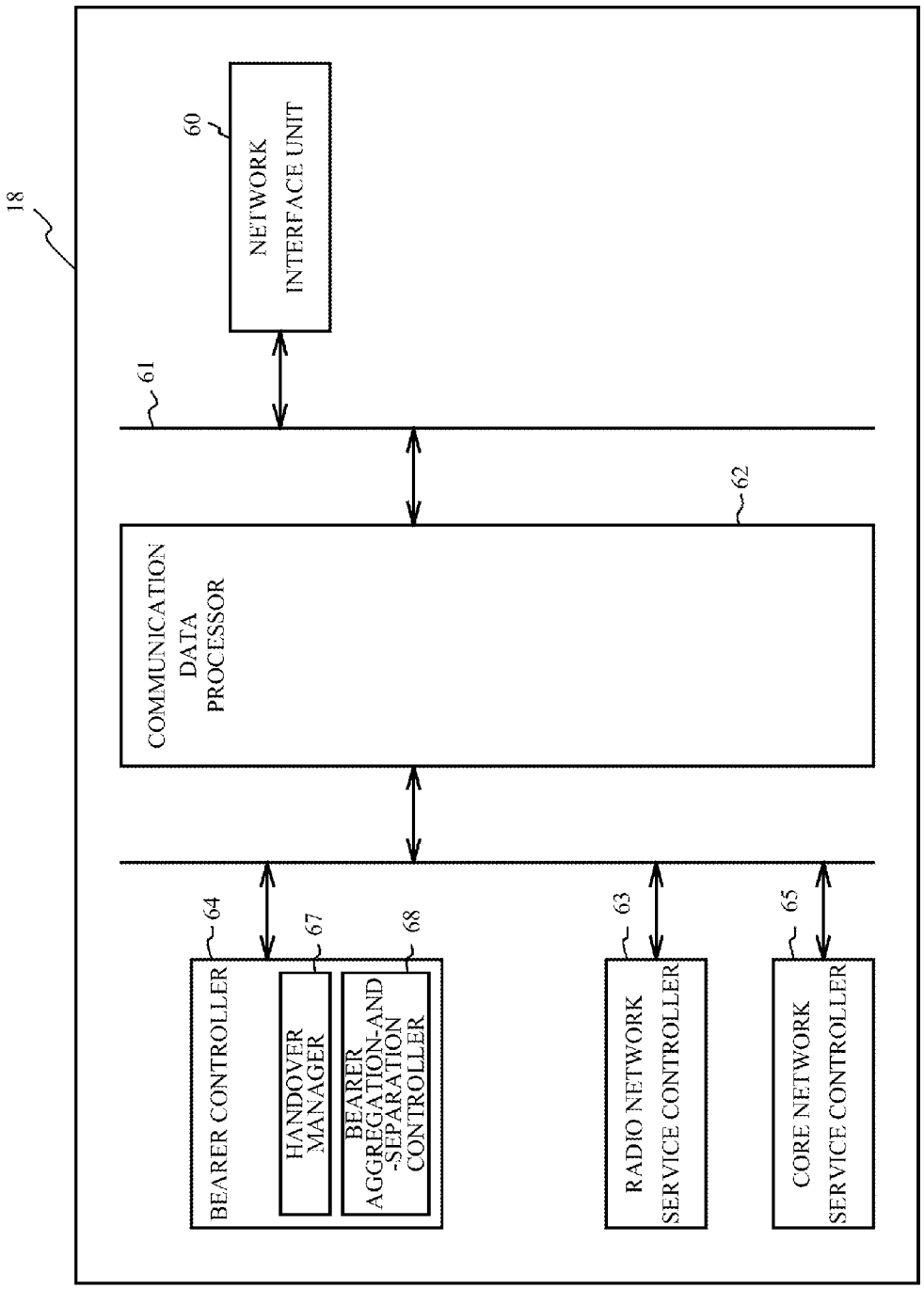
FIG. 5 is a block diagram of a MME.

FIG. 5 is a block diagram of the MME 18. The MME 18 includes a network interface unit 60, a communication data processor 62, a bearer controller 64, a radio network service controller 63, and a core network service controller 65. The elements are connected to each other via a bus 61. The network interface unit 60 transmits and receives control data to/from the SGSN 14a, the S-GW 14b, and the S-GW 16.

The communication data processor 62 performs routing of data and a process of a data transfer protocol. The bearer controller 64 causes the communication data processor 62 to perform the bearer setting. The bearer controller 64 includes a handover manager 67, and a bearer aggregation-and-separation controller 68. The handover manager 67 manages the handover. The bearer aggregation-and-separation controller 68 controls aggregation and separation of the bearers.

The radio network service controller 63 performs the termination of a service control signal to/from the mobile terminal 12, the setting and releasing of a channel of a radio zone, and the movement management. The core network service controller 65 performs the termination of the service control signals to/from the core network system 28, the setting and releasing of a channel other than the radio zone, and the movement management.

Figure 6:
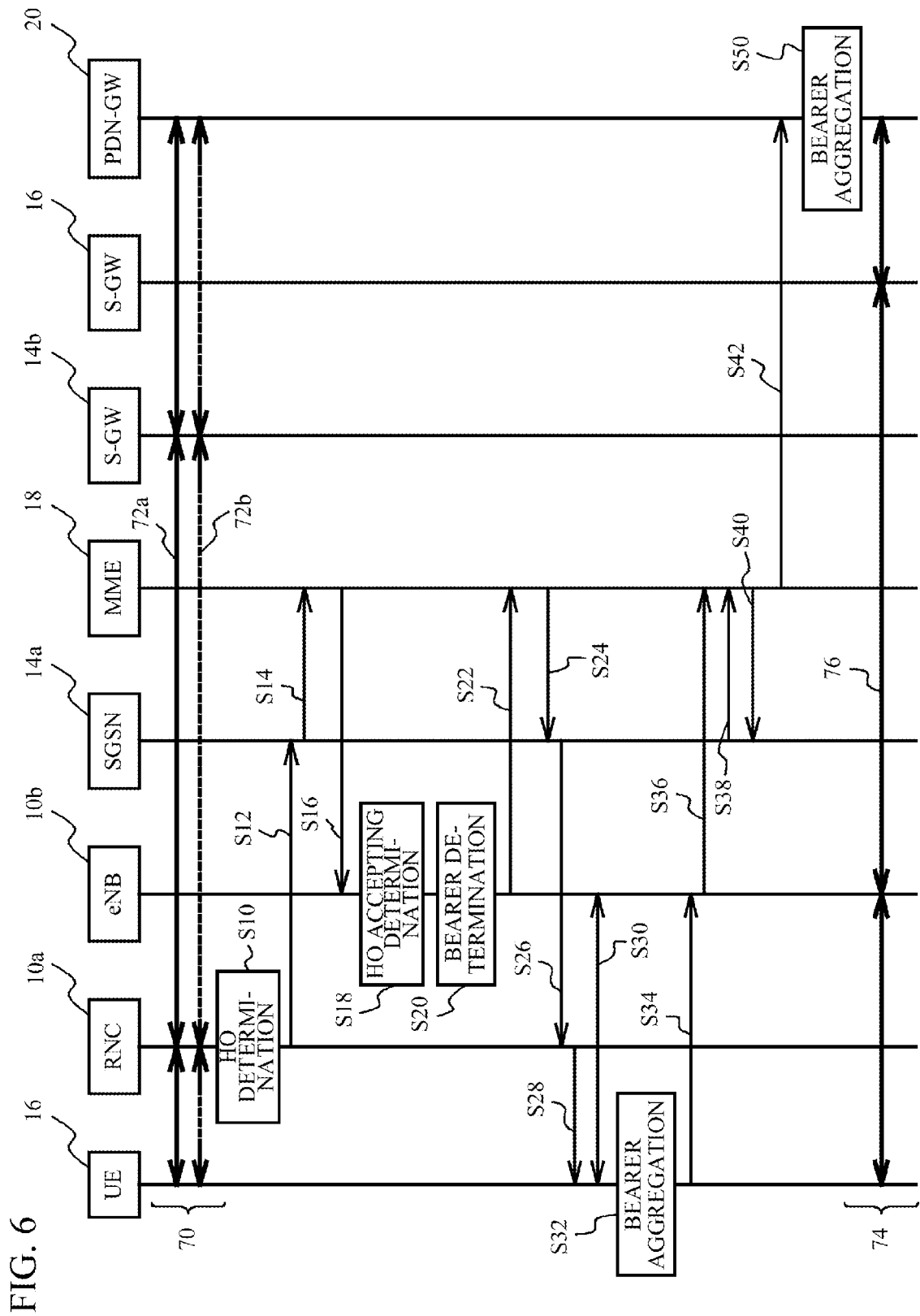
FIG. 6 is a sequence diagram of the communication system of the first embodiment.

FIG. 6 is a sequence diagram of the communication system of the first embodiment. FIG. 6 illustrates an example of a case where the base station 10a is a handover source, and the base station 10b is a handover target. The mobile terminal 12 communicates with the base station 10a. A user plane 70 is set between the mobile terminal 12 and the PDN-GW 20 via the base station 10a and the S-GW 14b. Two bearers 72a and 72b are set as the user plane 70. For example, the bearer 72a is a bearer for data, and the bearer 72a is a bearer for voice.

The handover manager 47 of the base station 10a determines whether to perform the handover (HO) (step S10). The source base station 10a gives a relocation request to the SGSN 14a (step S12). The SGSN 14a transfers the relocation request to the MME 18 (step S14). The MME 18 requests the handover to the target base station 10b (step S16). The handover manager 47 of the base station 10b determines whether to accept the handover (step S18). The bearer aggregation-and-separation controller 48 of the base station 10b determines whether to aggregate or separate the bearers (step S20). In the example of FIG. 6, the bearer aggregation-and-separation controller 48 determines that the bearers are aggregated.

The base station 10b performs an acknowledgment of the handover request to the MME 18 (step S22). An instruction on the aggregation of the bearers is also included in the acknowledge message. The MME 18 transfers a relocation request to the SGSN 14a (step S24). The SGSN 14 performs a relocation instruction to the base station 10a (step S26). The base station 10a instructs the mobile terminal 12 to perform the handover from the UTRAN to the eUTRAN (step S28). The mobile terminal 12 and the base station 10b establish radio access (step S30). An instruction on the aggregation of the bearers is also included in a message of the handover instruction from the base station 10a. Therefore, the bearer aggregation-and-separation controller 38 of the mobile terminal 12 aggregates the bearers (step S32).

The mobile terminal 12 reports to the base station 10b the completion of the handover to the eUTRAN (step S34). The base station 10b notifies the MME 18 of the completion of the handover (step S36). The SGSN 14a reports the completion of the relocation to the MME 18 (step S38). The MME 18 performs the acknowledgment to the completion of the relocation to the SGSN14a (step S40). The MME 18 instructs the S-GW 16 and the PDN-GW 20 to perform the bearer setting (step S42). An instruction on the aggregation of the bearers is also included in an instruction on the bearer setting. Therefore, the bearer aggregation-and-separation controller 68 of the PDN-GW aggregates and sets the bearers (step S50). Thereby, a user plane 74 is set between the mobile terminal 12 and the PDN-GW 20 via the base station 10b and the S-GW16. A single bearer 76 is set as the user plane 74. Therefore, when the mobile terminal 12 communicates with the base station 10a, the two bearers 72a and 72b can be aggregated to the single bearer 76 by performing the handover to the base station 10b.

Figure 7:
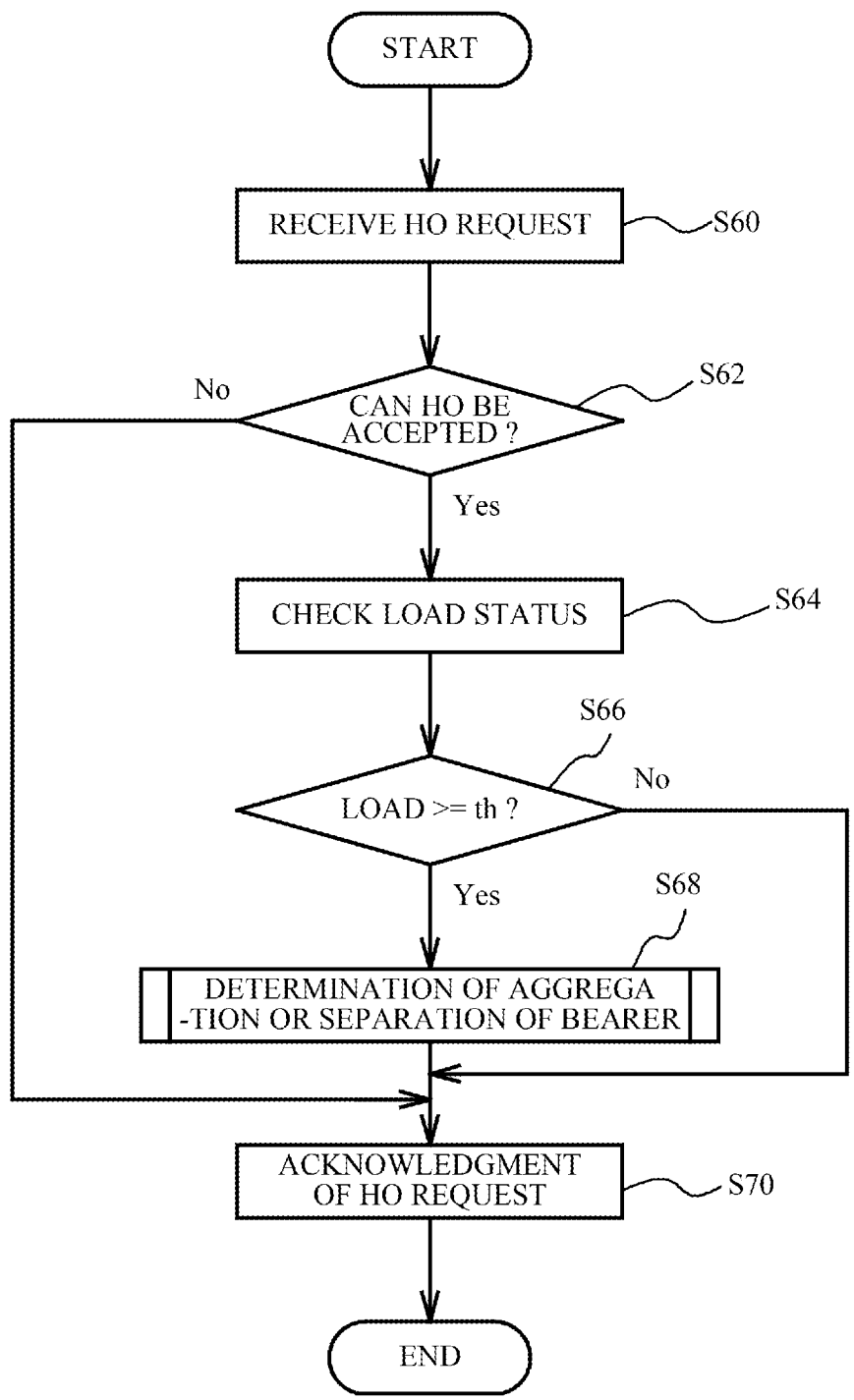
FIG. 7 is a flowchart illustrating processes of a target base station.

FIG. 7 is a flowchart illustrating processes of the base station 10b. The handover manager 47 of the base station 10b receives a handover request from the MME 18, as illustrated in FIG. 7 (step S60). This step corresponds to step S16 of FIG. 6.

Figure 8:
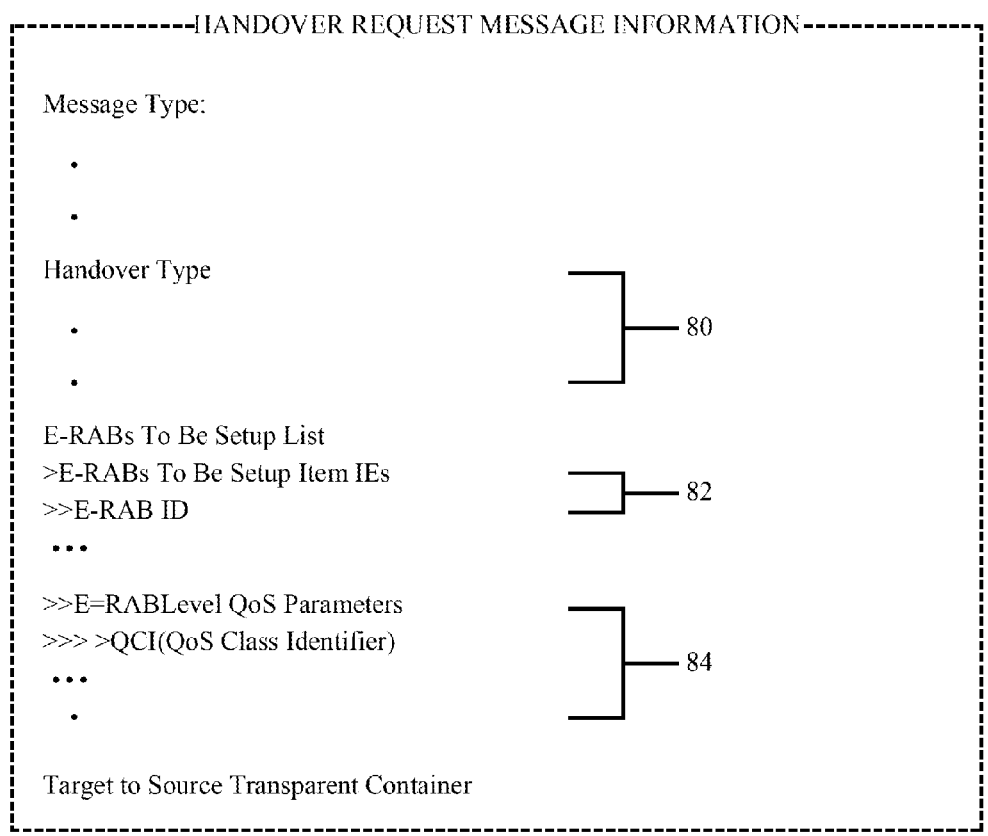
FIG. 8 is a diagram illustrating an example of a handover request message which the target base station receives.

FIG. 8 is a diagram illustrating an example of a handover request message which the base station 10b receives. With reference to FIG. 8, information related to the source base station 10a is described in Handover Type (area 80). Each ID of the bearers 72a and 72b set in the base station 10a (e.g. information for identifying the bearers) is described in E-RABs To Be Setup ItemlEs (area 82). Each quality class of the bearers 72a and 72b set in the source base station 10a is described in E-RAB Level QoS Parameters (area 84).

Returning to FIG. 7, the handover manager 47 of the base station 10b determines whether to be capable of accepting the handover (step S62). When the determination is NO, the procedure proceeds to step S70. In step S70, the handover manager 47 transmits information indicative of not accepting the handover to the MME 18.

When the determination in step S62 is YES, the communication data processor 42 of the base station 10b checks a status of a load which the base station 10b transmits and receives (step S64). For example, the communication data processor 42 checks at least one of an amount of messages and an amount of data of the use plane which the base station 10b processes within a given time period. The bearer aggregation-and-separation controller 48 of the base station 10b determines whether the load of the base station 10b is equal to or more than a given amount th (step S66). For example, the bearer aggregation-and-separation controller 48 determines whether the amount of messages within the given time period is equal to or more than the given amount. When the determination in step S66 is NO, the procedure proceeds to step S70. When the determination in step S66 is YES, the bearer aggregation-and-separation controller 48 determines to aggregate or separate the bearers (step S68). The handover manager 47 performs the acknowledgment of the handover request to the MME 18 (step S70).

Figure 9:
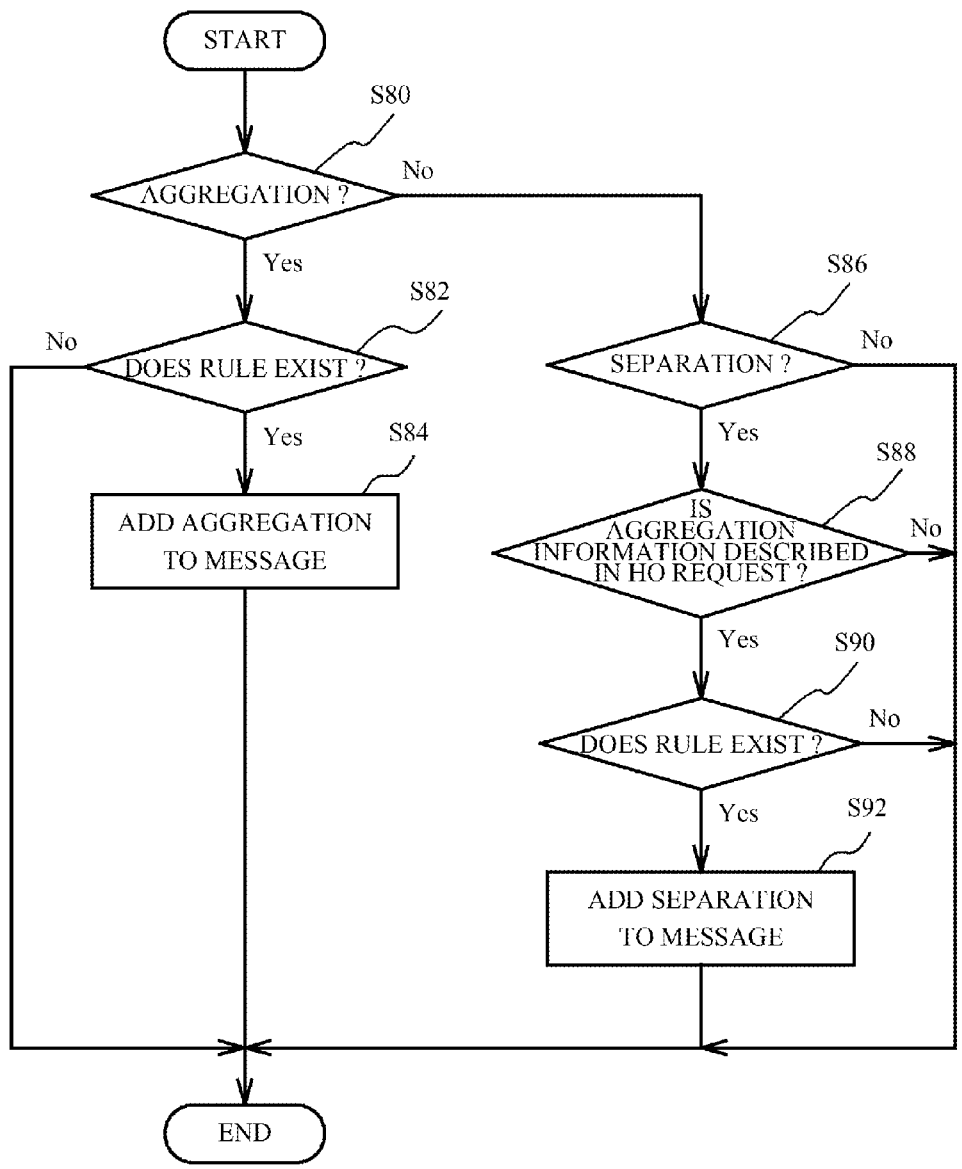
FIG. 9 is a flowchart illustrating processes which a bearer aggregation-and-separation controller of the target base station performs.

FIG. 9 is a flowchart illustrating processes which the bearer aggregation-and-separation controller 48 of the base station 10b performs in step S68 of FIG. 7. The bearer aggregation-and-separation controller 48 determines whether the handover is a type of a handover aggregating the bearers (step S80). When the handover is handover from the base station 10a of the UTRAN to the base station 10b of the eUTRAN, the handover heightens the basic performance of the bearers. Therefore, the bearer aggregation-and-separation controller 48 determines that the handover is the type of the handover aggregating the bearers. When the basic performance of the bearers does not change or lowers after the handover, the bearer aggregation-and-separation controller 48 determines that the determination of step S80 is NO. When the determination of step S80 is YES, the bearer aggregation-and-separation controller 48 determines whether a rule of the aggregation exists (step S82). For example, the bearer aggregation-and-separation controller 48 determines whether bearer groups corresponding to the rule of the aggregation are described in the areas 82 and 84 of the handover request message of FIG. 8.

Figure 10:
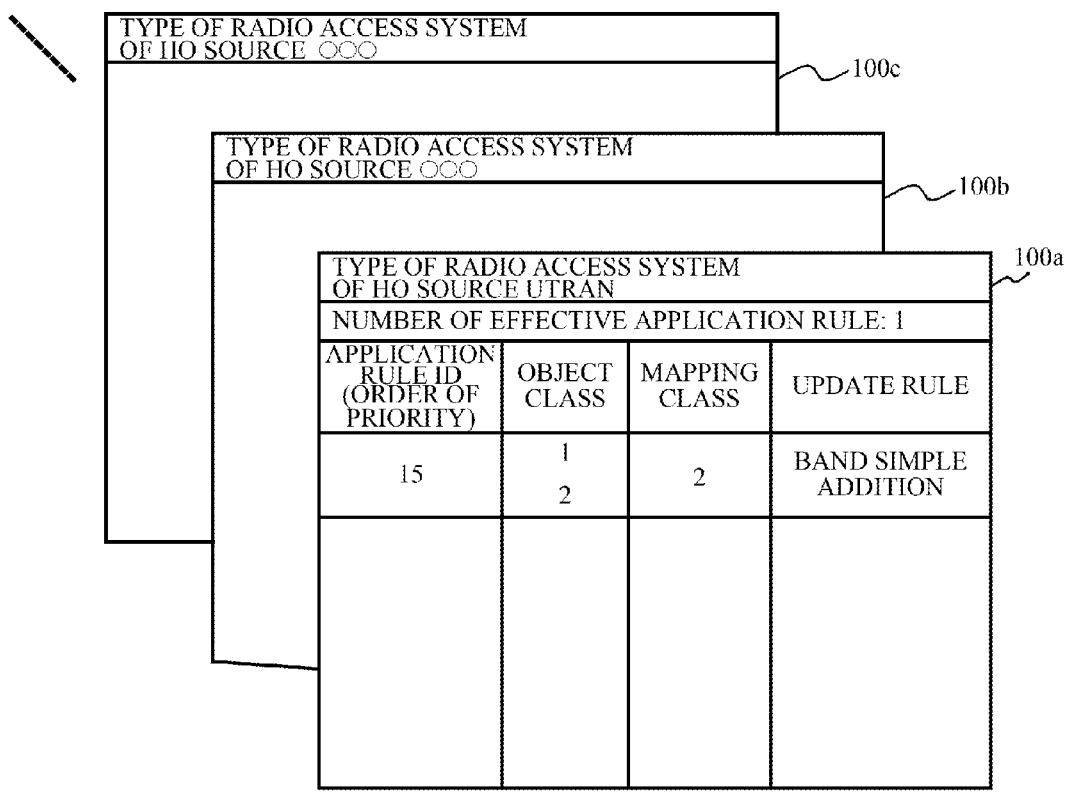
FIG. 10 is a diagram illustrating an example of rule set tables for bearer aggregation which the target base station includes.

A description will be given of an example of step S82. FIG. 10 is a diagram illustrating an example of rule set tables for bearer aggregation which the base station 10b includes. With reference to FIG. 10, in the base station 10b, a plurality of rule set tables 100a to 100c are prepared for respective types of access systems of the handover source. A number of effective application rules, an application rule ID, an object class, a mapping class, and a parameter update rule are stored into each of the rule set tables 100a to 100c.

The number of effective application rules is the number of rules which the bearer can aggregate when the handover from the access system of the handover source (i.e., the base station 10 a in this example) to the base station 10b is performed. In this example, the number of effective application rules is "1". The application rule ID is an ID of the rule for aggregating the bearers. The ID may serve as priority to be applied. The object class indicates quality classes of the bearers of the handover source. In this example, the object class is "1" and "2". The mapping class indicates a quality class after the aggregation. In this example, the mapping class is "2". This table indicates that, in the handover from the base station 10a to the base station 10b, the bearer 72a of the class 1 of the UTRAN and the bearer 72b of the class 2 of the UTRAN can be aggregated to the bearer 76 of the class 2 of the eUTRAN. The update rule indicates a rule when the bearers are aggregated. For example, in this example, the update rule is band simple addition, i.e., a bandwidth obtained by simply adding a bandwidth of the bearer 72a to a bandwidth of the bearer 72b becomes a bandwidth of the bearer 76.

In step S82 of FIG. 9, the bearer aggregation-and-separation controller 48 can determine the type of the radio access system of the handover source from the Handover Type described in the area 80 of FIG. 8. The bearer aggregation-and-separation controller 48 can recognize the types of the bearers from information in the area 82, and the quality classes of the bearers of the handover source from information in the area 84. Therefore, the bearer aggregation-and-separation controller 48 can determine whether the rule for aggregating the bearers exists based on FIG. 10.

When the determination in step S82 of FIG. 9 is NO, the procedure is terminated. That is, the aggregation and the separation of the bearers are not performed. When the determination in step S82 of FIG. 9 is YES, the bearer aggregation-and-separation controller 48 adds aggregating the bearers to an acknowledge message of the handover request (step S84).

Figure 11:
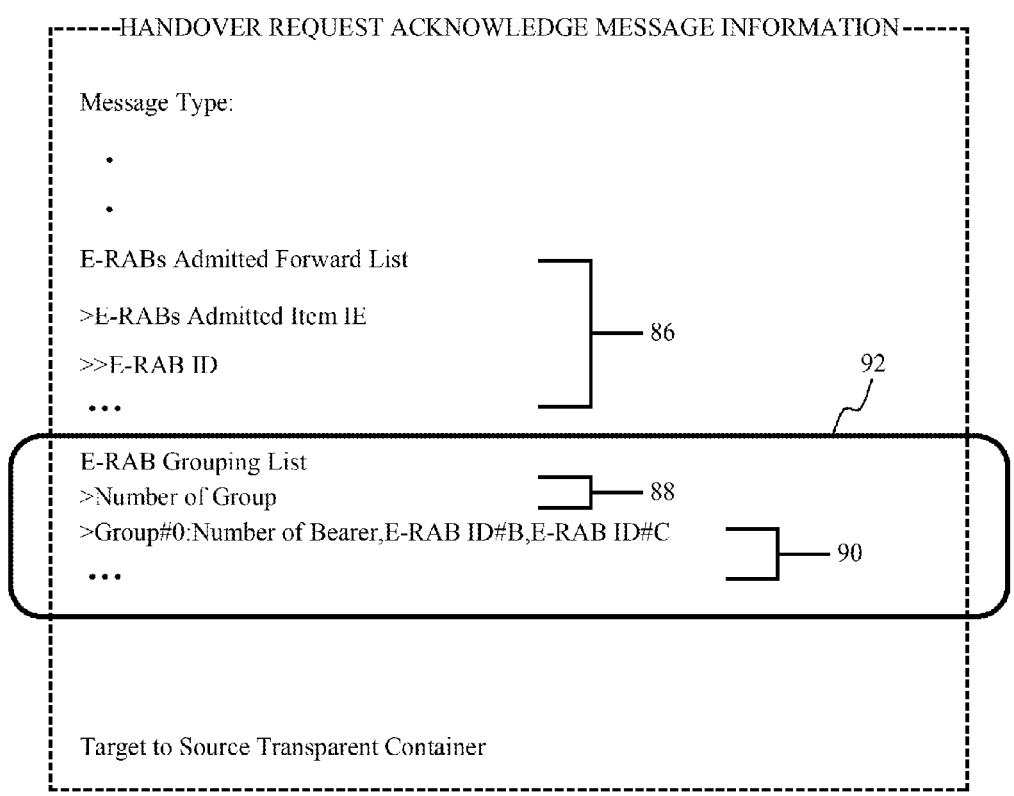
FIG. 11 is a diagram illustrating an example of an acknowledge message of a handover request which the target base station transmits.

FIG. 11 is a diagram illustrating an example of the acknowledge message of the handover request which the base station 10b transmits. With reference to FIG. 11, information of the bearers before the aggregation is described in E-RABs Admitted Forward List (area 86). The bearer aggregation-and-separation controller 48 adds an area 92 in the acknowledge message of the handover request. Specifically, the bearer aggregation-and-separation controller 48 describes the number of groups of the bearer to be aggregated, in an area 88. In addition, the bearer aggregation-and-separation controller 48 describes the number of bearers to be aggregated and the IDs of the bearers to be aggregated for each group, in an area 90.

Returning to FIG. 9, the procedure is terminated after step S84. When the determination of step S80 is NO, the bearer aggregation-and-separation controller 48 determines whether the handover is a type of a handover separating the bearers (step S86). When the handover lowers the basic performance of the bearers, the bearer aggregation-and-separation controller 48 determines that the handover is the type of the handover separating the bearers. When the basic performance of the bearers does not change after the handover, the bearer aggregation-and-separation controller 48 determines that the determination of step S86 is NO. When the determination of step S86 is YES, the bearer aggregation-and-separation controller 48 determines whether aggregation information added in advance is described in the handover request message (step S88). For example, in FIG. 11, information on the aggregation of the bearers added to the acknowledge message of the handover request is then described in each message. Therefore, the bearer aggregation-and-separation controller 48 determines whether information indicating which bearer of the handover target the bearer used by the handover source has aggregated is described in the message of the handover request. When the determination of step S88 is NO, the bearer aggregation-and-separation controller 48 cannot determine how the bearers are separated, and hence the procedure is terminated as it is.

When the determination of step S88 is YES, the bearer aggregation-and-separation controller 48 determines whether a separation rule exists (step S90). For example, when the bearers aggregated according to a rule "15" which is the application rule ID of FIG. 10 are separated, the bearer aggregation-and-separation controller 48 determines whether the IDs of the bearers corresponding to the object classes 1 and 2 exist in the handover request message. When the determination of step S90 is NO, the bearer aggregation-and-separation controller 48 cannot recognize the IDs of the bearers after the separation, and hence the procedure is terminated. When the determination of step S90 is YES, the bearer aggregation-and-separation controller 48 adds indication or sign separating the bearers to the acknowledge message of the handover request (step S92). For example, the bearer aggregation-and-separation controller 48 deletes a message (an area 92) on the aggregation of the bearers from the acknowledge message of the handover request of FIG. 11. Then, the procedure is terminated.

Figure 12:
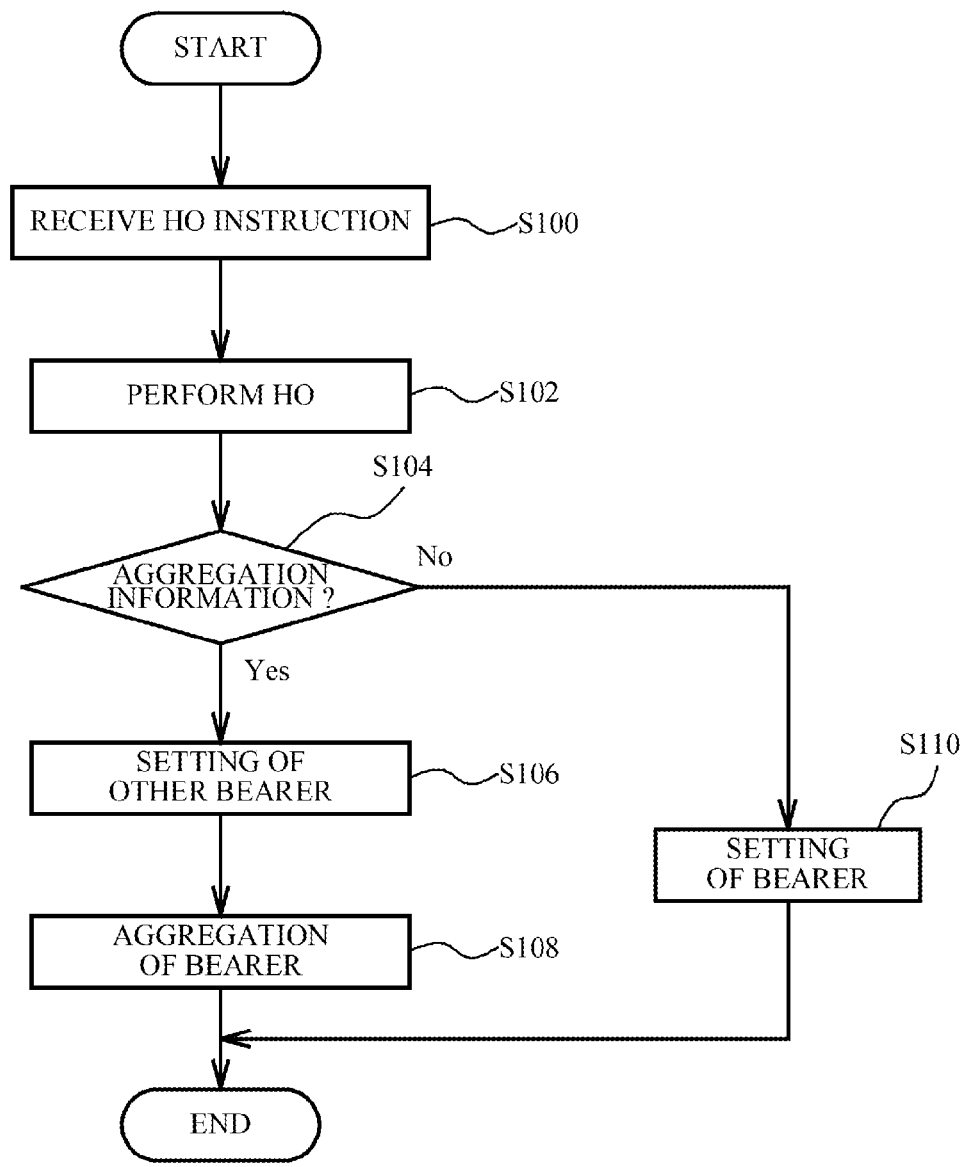
FIG. 12 is a flowchart illustrating processes of the mobile terminal.

FIG. 12 is a flowchart illustrating processes of the mobile terminal 12. With reference to FIG. 12, the handover manager 37 of the mobile terminal 12 receives a handover instruction from the base station 10a (step S100). This step corresponds to step S28 of FIG. 6. The handover manager 37 performs the handover (step S102). This step corresponds to step S30 of FIG. 6. The bearer aggregation-and-separation controller 38 of the mobile terminal 12 determines whether the aggregation information of the bearers is included in the massage of the handover instruction (step S104).

Figure 13:
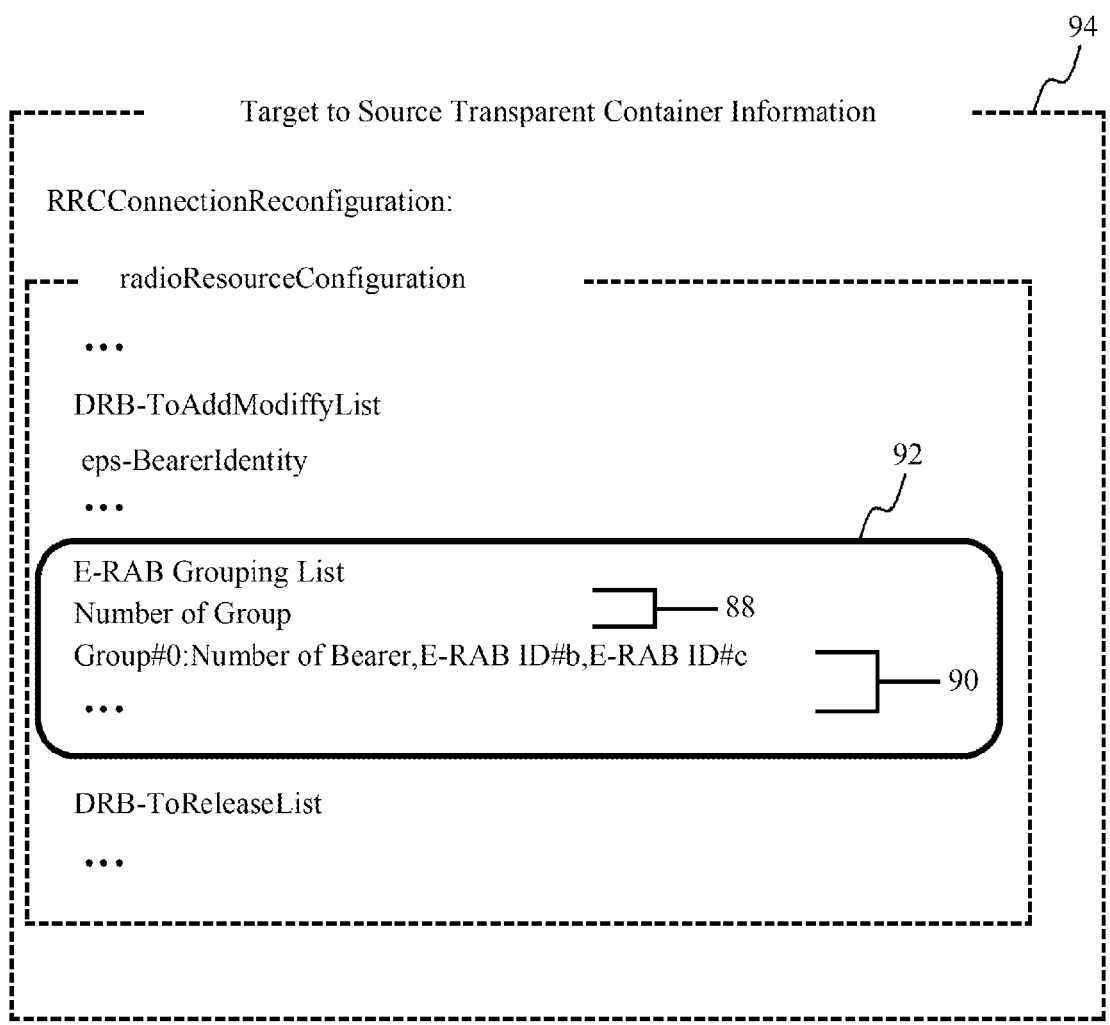
FIG. 13 is a diagram illustrating a part of the message of a handover instruction.

FIG. 13 illustrates a part of the message of the handover instruction. With reference to FIG. 13, Target to Source Transpatrent Comtainer information 94 is a message transferred from the target base station 10b to the source base station 10a. The same message as the area 92 of FIG. 11 exists in the message 94. Thereby, the bearer aggregation-and-separation controller 38 determines that the determination of step S104 is YES.

In step S104, the handover manager 37 performs setting of bearers other than the aggregated bearers (step S106). This step corresponds to step S30 of FIG. 6. The bearer aggregation-and-separation controller 38 aggregates and sets the bearers based on the instruction notified from the base station 10b (step S108). For example, the bearer aggregation-and-separation controller 38 aggregates and sets the bearers 72a and 72b to the bearer 76. This step corresponds to step S32 of FIG. 6. When the determination of step S104 is NO, the handover manager 37 performs the setting of the bearers (step S110). The bearer aggregation-and-separation controller 38 does not perform the aggregation of the bearers. In step S92 of FIG. 9, when the base station indicates the separation of the bearers to the message, the area 92 of FIG. 13 is deleted, for example. Therefore, the bearer aggregation-and-separation controller 38 determines that the determination of step S104 is NO. Thereby, each of the bearers is set, and hence the bearers are separated.

In steps S42 and S50 of FIG. 6, the PDN-GW 20 can also aggregate and separate the bearers by performing the same processes as steps S104 to S110 of FIG. 12.

Figure 14A:
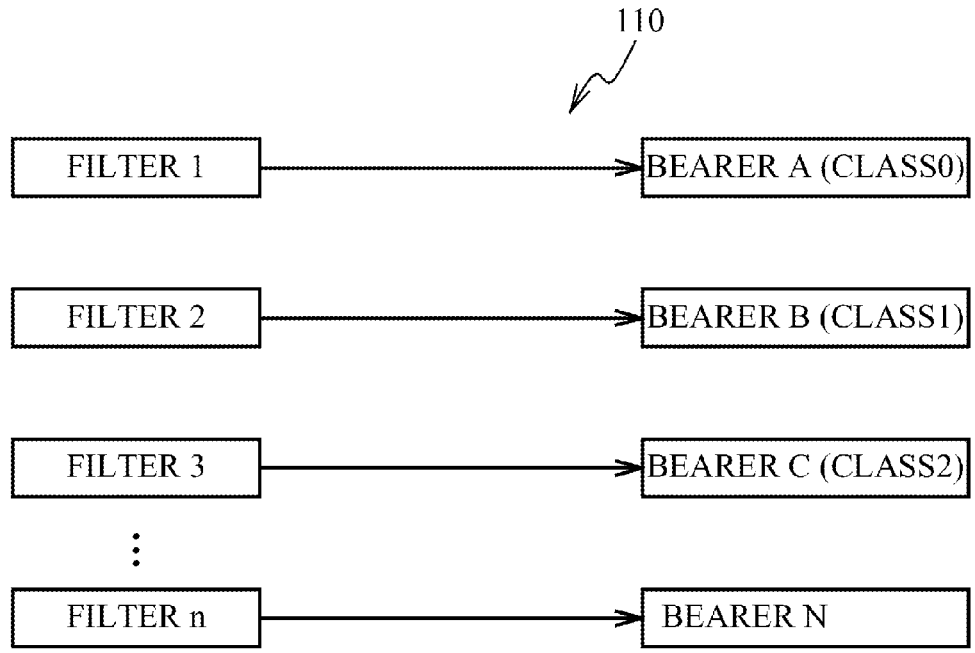
FIGS. 14A and 14B are diagrams illustrating methods in which the mobile terminal and the PDN-GW aggregate and separate the bearers.
Figure 14B:
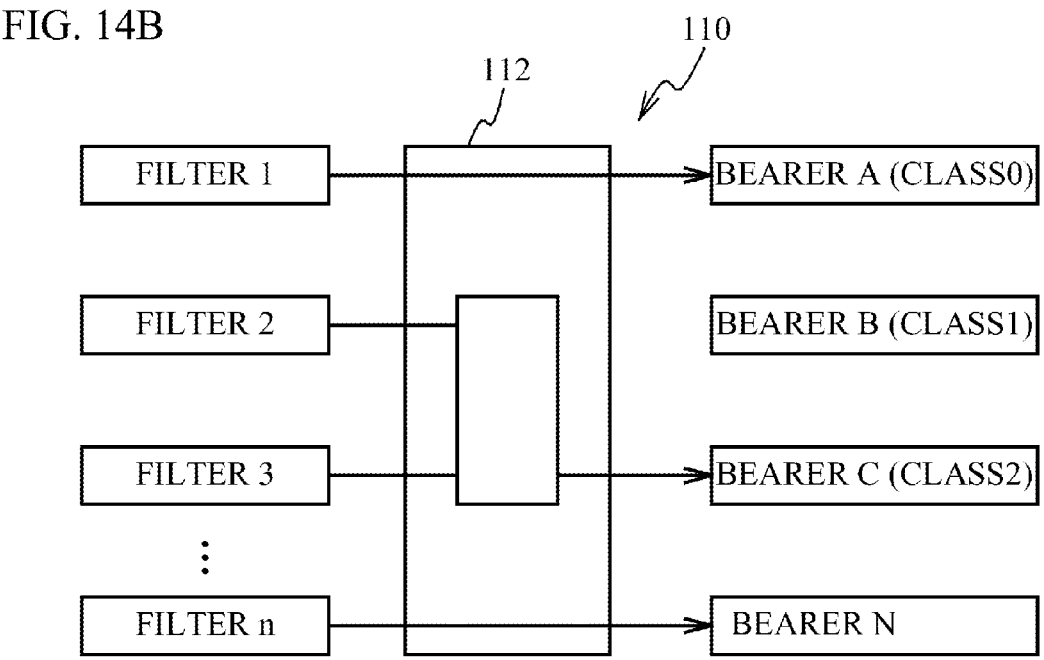

FIGS. 14A and 14B are diagrams illustrating methods in which the mobile terminal 12 and the PDN-GW 20 aggregate and separate the bearers in steps S104 to S110 of FIG. 12. A description will be given of an example of the mobile terminal 12.

FIG. 14A illustrates an example of a table when the bearers are not aggregated. In a table 110, bearer information is associated with filter information, as illustrated in FIG. 14A. IP flow identifying information, an source address, a target address, and so on are included in the filter information. The IDs of the bearers are included in the bearer information. The mobile terminal 12 recognizes the IP flow identifying information, the source address and the target address from a header of packet data. Thereby, the mobile terminal 12 can determine which bearer is used for transmitting this packet data by using the table 110.

FIG. 14B illustrates an example of a table when the bearers are aggregated. When the bearers are aggregated in step S108 of FIG. 12, as illustrated in FIG. 14B, an intermediate table 112 is provided between the filter information and the bearer information of the table 110. In the intermediate table 112, filter information 1 and n correspond to bearer information as it is. On the other hand, filter information 2 and 3 correspond to a bearer C. Thereby, packet data corresponding to the filter information 2 and 3 is transmitted using the bearer C.

When the packet data is transmitted without using the intermediate table 112 as illustrated in FIG. 14A, the packet data is transmitted via the bearers which are not aggregated. On the other hand, when the packet data is transmitted using the intermediate table 112 as illustrated in FIG. 14B, the packet data is transmitted via the aggregated bearers.

According to the base station 10b of the first embodiment, an accepting portion (e.g. the handover manager 47) of the base station 10b determines whether to be capable of accepting the handover from another base station device (e.g. the base station 10a) to the base station 10b, as illustrated in step S62 of FIG. 7. When the accepting portion determines to be capable of accepting the handover, as illustrated in step S68, a determination portion (e.g. the bearer aggregation-and-separation controller 48) of the base station 10b determines whether to aggregate or separate bearers set between another base station device (e.g. base station 10a) and the mobile terminal 12. A notifying portion (e.g. the bearer aggregation-and-separation controller 48) notifies the mobile terminal 12 of an instruction of aggregation or separation of the bearers, as illustrated in step S70.

According to the mobile terminal 12 of the first embodiment, a handover portion (e.g. the handover manager 37) performs the handover from the base station 10a to the base station 10b, as illustrated in step S102 of FIG. 12. When the handover manager 37 performs the handover, a bearer change portion (e.g. the bearer aggregation-and-separation controller 38) aggregates and separates the bearers set between the base station 10b and the mobile terminal 12, as illustrated in step S108. The bearer change portion aggregates and separates the bearers based on an instruction notified from the base station.

When the aggregation of the bearers as illustrated in the first embodiment is not performed, two bearers corresponding to the bearers 72a and 72b are set between the mobile terminal 12 and the PDN-GW 20, in steps S30, S34 and S42 of FIG. 6. When the handover is performed from the radio access system with low communication performance (e.g. UTRAN) to the radio access system with high communication performance (e.g. the eUTRAN), the communication performance of the bearers improves. Therefore, there is a case where the communication quality can be maintained even if the number of bearers reduces. However, when the number of bearers reduces after the bearers are set, the number of signaling messages used for reducing the number of bearers increases.

According to the first embodiment, in such a case, it is possible to aggregate the bearers, and release the resource of the communication system. On the other hand, when the handover is performed from the radio access system with high communication performance to the radio access system with low communication performance, there is a case where the communication quality cannot be maintained if the number of bearers does not increase. According to the first embodiment, in such a case, it is possible to maintain the communication quality by separating the bearers. Thus, according to the first embodiment, the setting of the bearers can be properly performed.

In addition, according to the first embodiment, when the handover manager 47 determines whether to be capable of accepting the handover, the bearer aggregation-and-separation controller 48 determines the aggregation or separation of the bearers. Thereby, the number of transmission and reception messages for aggregating or separating the bearers can be reduced, compared to a case where the bearers are aggregated or separated after setting bearers.

Moreover, according to the first embodiment, a notifying portion (e.g. the bearer aggregation-and-separation controller 48) transmits an instruction of the aggregation or separation of the bearers along with an acknowledge of the handover request (a message about the handover) to the mobile terminal 12, as illustrated in FIG. 11. Thereby, the message can be reduced.

Further, a determination portion (e.g. the bearer aggregation-and-separation controller 48) can determine the aggregation or separation of the bearers based on a difference of radio technology of the base stations 10a and 10b (e.g. a difference of communication performance), as illustrated in step S80 of FIG. 9. In addition, the determination portion (e.g. the bearer aggregation-and-separation controller 48) can determine the aggregation or separation of the bearers based on request quality of bearers, as illustrated in step S82 of FIG. 9 and FIG. 10. Further, the determination portion (e.g. the bearer aggregation-and-separation controller 48) can determine the aggregation or separation of the bearers based on the status of the load of the base station 10b, as illustrated in step S66 of FIG. 7. For example, when the load of the base station 10b is large, the bearers are aggregated and a released resource can be used for the setting of another bearer. On the contrary, when the load of the base station 10b is small, the bearers are not aggregated and a process for the aggregation of the bearers can be reduced.

Embodiment 2

Figure 15:
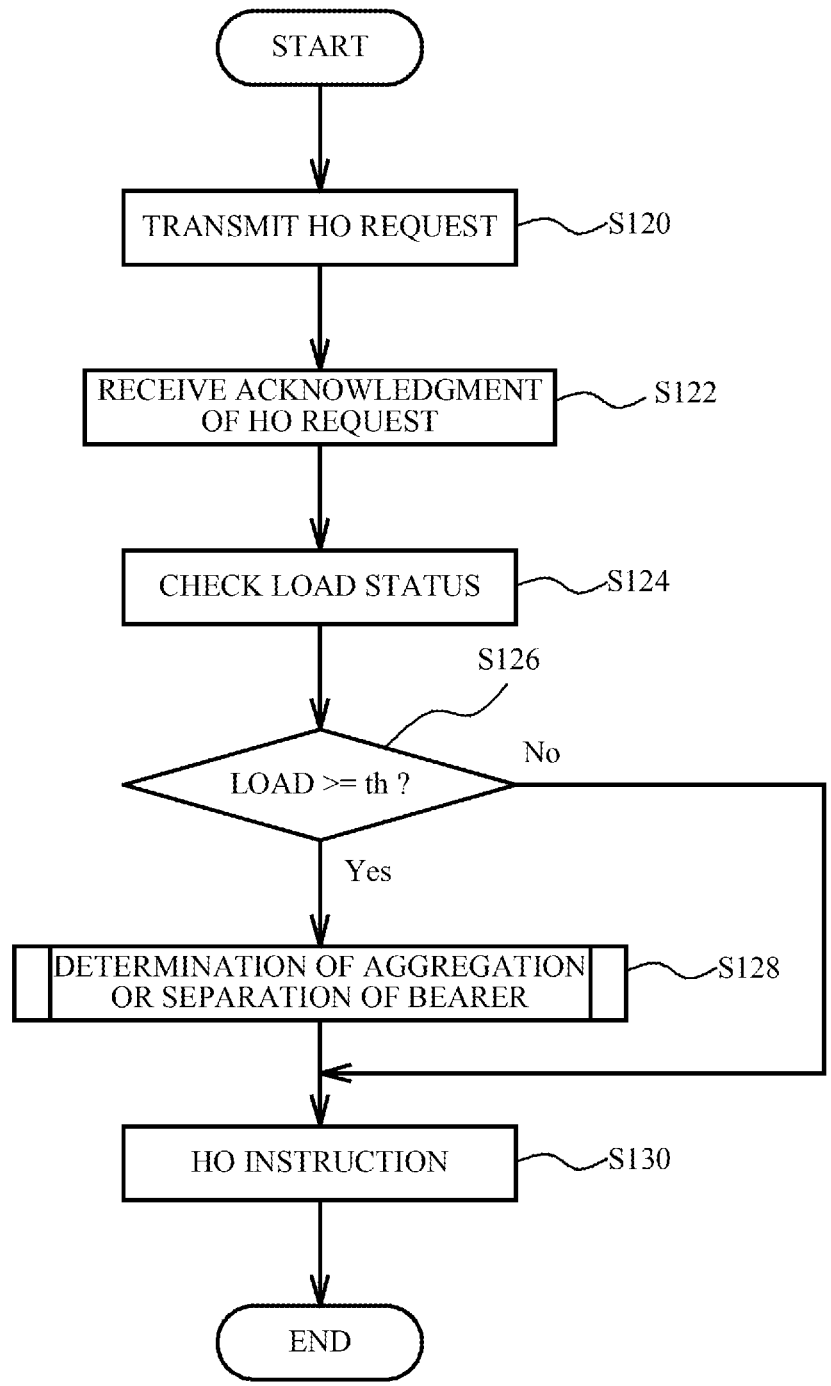
FIG. 15 is a flowchart illustrating processes which the MME of the second embodiment performs.

A second embodiment illustrates an example of a case where the MME 18 determines the aggregation or separation of the bearers. FIG. 15 is a flowchart illustrating processes which the MME 18 of the second embodiment performs. The handover manager 67 of the MME 18 transmits a handover request to the base station 10b (step S120). This step corresponds to step S16 of FIG. 6. The handover manager 67 receives an acknowledgment of the handover request from the base station 10b (step S122). This step corresponds to step S22 of FIG. 6. The communication data processor 62 of the MME 18 checks a status of a load which the base station 10b transmits and receives (step S124). The bearer aggregation-and-separation controller 68 determines whether the load of the base station 10b is equal to or more than a given amount th (step S126). When the determination in step S126 is NO, the procedure proceeds to step S130. When the determination in step S126 is YES, the bearer aggregation-and-separation controller 68 determines whether to aggregate or separate the bearers (step S128). The handover manager 67 performs a handover instruction to the SGSN 14a (step S130).

Figure 16:
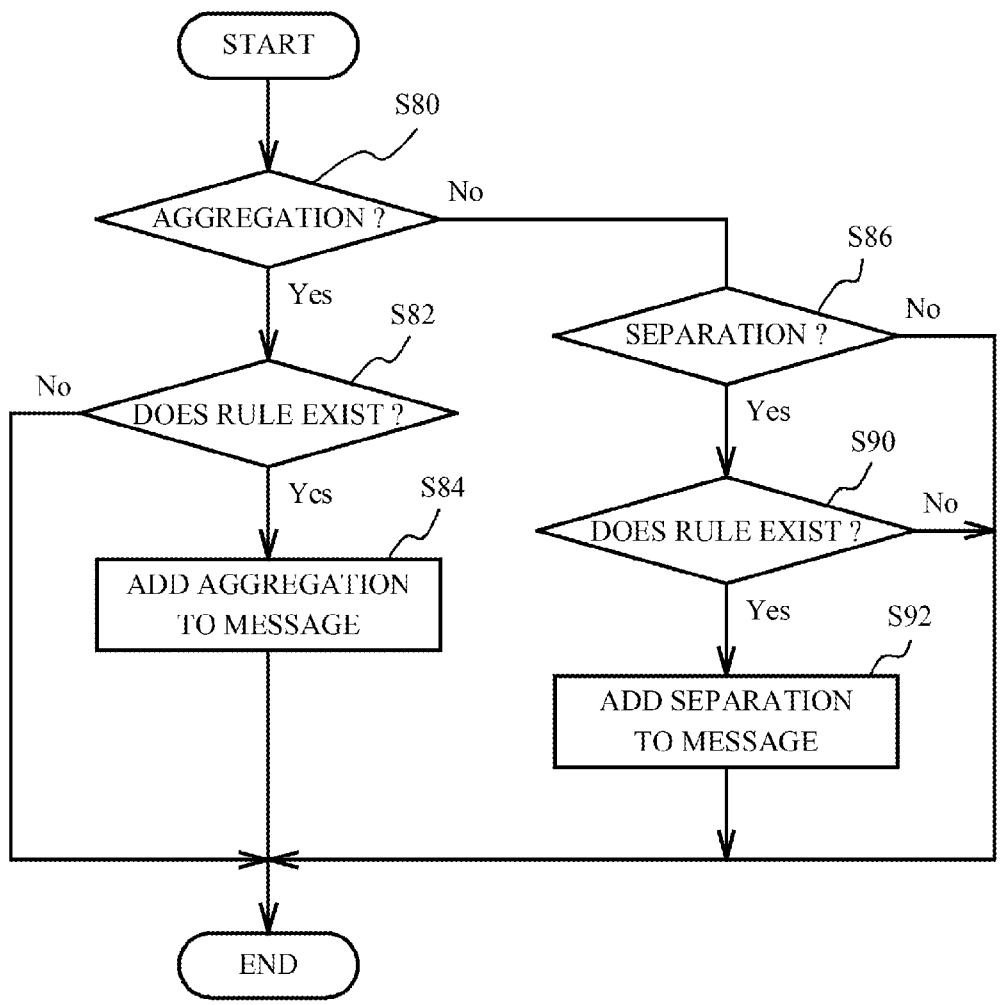
FIG. 16 is a flowchart illustrating processes which the bearer aggregation-and-separation controller of the MME performs.

FIG. 16 is a flowchart illustrating processes which the bearer aggregation-and-separation controller 68 of the MME 18 performs in step S128 of FIG. 15. Since the processes except step S88 of FIG. 9 not being performed are the same as the processes which the bearer aggregation-and-separation controller 68 of the base station 10b of the first embodiment performs, a description thereof will be omitted.

According to a base station controlling device (e.g. the MME 18) of the second embodiment, a request portion (e.g. the handover manager 67) of the MME 18 requests the base station 10b to perform the handover from another base station device (e.g. the base station 10a) to a base station device (e.g. the base station 10b), as illustrated in step S120 of FIG. 15. When the determination portion (e.g. the bearer aggregation-and-separation controller 68) determines that the base station 10b can accept the handover, the determination portion determines whether to aggregate or separate the bearers set between the base station 10a and the mobile terminal 12, as illustrated in step S128. The notifying portion (e.g. the bearer aggregation-and-separation controller 68) notifies the mobile terminal 12 of a result of the determination of the aggregation or separation of the bearers, as illustrated in step S130. Thus, the bearer aggregation-and-separation controller 68 of the MME 18 (the base station controlling device) can determine whether to aggregate or separate the bearers set between the base station 10a and the mobile terminal 12.

The notifying portion (e.g. the bearer aggregation-and-separation controller 68) notifies the mobile terminal 12 of an instruction of the aggregation or separation of the bearers along with a relocation instruction (a message about the handover). Thereby, the message can be reduced.

Moreover, as is the case with the first embodiment, the determination portion can determine the aggregation or separation of the bearers based on at least one of the difference of radio technology of the base stations 10a and 10b, the request quality of bearers, and the status of the load of the base station 10b.

In addition, the determination portion can determine the aggregation or separation of the bearers based on a difference of radio technology of the base stations 10a and 10b (e.g. a difference of communication performance), as illustrated in step S80 of FIG. 16. In addition, the determination portion can determine the aggregation or separation of the bearers based on the request quality of bearers, as illustrated in step S82 of FIG. 16 and FIG. 10. Further, the determination portion can determine the aggregation or separation of the bearers based on the status of the load of the base station 10b, as illustrated in step S126 of FIG. 15.

In the first and the second embodiments, a description is given of an example of a case where the base station 10a (another base station device) is a base station device using 3GPP UTRA technology, and the base station 10b (base station device) is a base station device using 3GPP eUTRA technology. In this case, the handover from the system with low communication performance to the system with high communication performance is performed. Therefore, it is desirable that the bearer aggregation-and-separation controller 48 determines whether to aggregate the bearers. The base stations 10a and 10b can be base stations using other communication technology. That is, the radio access systems 26a and 26b can be radio access systems using other communication technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A base station device that communicates wirelessly with a mobile terminal, comprising:
   an accepting portion that determines whether to be capable of accepting handover from another base station device to the base station device;
   a determination portion that, when the accepting portion determines to be capable of accepting the handover, determines whether to aggregate or separate bearers set between the another base station device and the mobile terminal based on communication performances of the base station device and the another base station device; and
   a notifying portion that notifies the mobile terminal of a determination result of aggregation or separation of the bearers,
   wherein the determination portion determines to aggregate the bearers when the communication performance of the base station device is higher than the communication performance of the another base station device, and not to aggregate the bearers when the communication performance of the base station device is lower than or equal to the communication performance of the another base station device.

2. The base station device as claimed in claim 1, wherein the notifying portion notifies a base station controlling device of the determination result of aggregation or separation of the bearers along with information about the handover.

3. A base station controlling device that controls wireless communication between a mobile terminal and a base station device, comprising:
   a request portion that requests the base station device to perform handover from another base station device to the base station device;
   a determination portion that, when the base station device determines to be capable of accepting the handover, determines whether to aggregate or separate bearers set between the another base station device and the mobile terminal based on communication performances of the base station device and the another base station device; and
   a notifying portion that notifies the mobile terminal of a determination result of aggregation or separation of the bearers,
   wherein the determination portion determines to aggregate the bearers when the communication performance of the base station device is higher than the communication performance of the another base station device, and not to aggregate the bearers when the communication performance of the base station device is lower than or equal to the communication performance of the another base station device.

4. The base station controlling device as claimed in claim 3, wherein the notifying portion notifies the mobile terminal of the determination result of aggregation or separation of the bearers along with information about the handover.

5. A mobile terminal that communicates wirelessly with a base station, comprising:
   a handover portion that performs handover from another base station device to the base station device; and
   a bearer change portion that, when the handover portion performs the handover, aggregates or separates bearers set between the another base station device and the mobile terminal, based on an instruction notified from the base station device,
   wherein the instruction is determined based on communication performances of the base station device and the another base station device,
   wherein the instruction is determined to aggregate the bearers when the communication performance of the base station device is higher than the communication performance of the another base station device, and not to aggregate the bearers when the communication performance of the base station device is lower than or equal to the communication performance of the another base station device.

6. A communication system, comprising:
   a base station device that determines whether to be capable of accepting handover from another base station device to the base station device;

a base station controlling device that, when the base station device determines to be capable of accepting the handover, determines whether to aggregate or separate bearers set between the another base station device and a mobile terminal based on communication performances of the base station device and the another base station device; and the mobile terminal that, when the handover is performed, aggregate or separate the bearers based on a determination result of aggregation or separation of the bearers, wherein the base station device determines to aggregate the bearers when the communication performance of the base station device is higher than the communication performance of the another base station device, and not to aggregate the bearers when the communication performance of the base station device is lower than or equal to the communication performance of the another base station device.

7. A method for controlling a base station device that communicates wirelessly with a mobile terminal, comprising:

determining whether to be capable of accepting handover from another base station device to the base station device;

determining whether to aggregate or separate bearers set between the another base station device and the mobile terminal based on communication performances of the base station device and the another base station device when it is determined that the handover can be accepted; and notifying the mobile terminal of a determination result of aggregation or separation of the bearers, wherein determining whether to aggregate or the separate the bearers includes determining to aggregate the bearers when the communication performance of the base station device is higher than the communication performance of the another base station device, and not to aggregate the bearers when the communication performance of the base station device is lower than or equal to the communication performance of the another base station device.

8. The base station device as claimed in claim 1, wherein the determination portion determines to separate the bearers when the communication performance of the base station device is lower than the communication performance of the another base station device.

9. The base station device as claimed in claim 8, wherein the notifying portion notifies the mobile terminal of a massage of a handover instruction including information of bearers before aggregating the bearers when the determination result indicates the aggregation, and wherein when the communication performance of the base station device is lower than the communication performance of the another base station device, the determination portion determines to separate the bearers when a message of a handover instruction includes the information of bearers before aggregating the bearers, and not separate the bearers when the massage does not include the information.

* * * * *